United States Patent
Galpin et al.

(10) Patent No.: US 12,149,726 B2
(45) Date of Patent: Nov. 19, 2024

(54) MOTION REFINEMENT USING A DEEP NEURAL NETWORK

(71) Applicant: InterDigital Madison Patent Holdings, SAS, Paris (FR)

(72) Inventors: Franck Galpin, Cesson-Sevigne (FR); Philippe Bordes, Cesson-Sevigne (FR); Philippe Guillotel, Cesson-Sevigne (FR); Xuan Hien Pham, Fontenay-aux-Roses (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 104 days.

(21) Appl. No.: 17/921,293

(22) PCT Filed: May 18, 2021

(86) PCT No.: PCT/EP2021/063056
§ 371 (c)(1),
(2) Date: Oct. 25, 2022

(87) PCT Pub. No.: WO2021/239500
PCT Pub. Date: Dec. 2, 2021

(65) Prior Publication Data
US 2023/0171421 A1    Jun. 1, 2023

(30) Foreign Application Priority Data
May 29, 2020  (EP) .................................. 20305565

(51) Int. Cl.
*H04N 19/51*    (2014.01)
(52) U.S. Cl.
CPC .................. *H04N 19/51* (2014.11)

(58) Field of Classification Search
CPC ......................................................... H04N 19/51
(Continued)

(56) References Cited

U.S. PATENT DOCUMENTS

| 2018/0184108 A1* | 6/2018 | Zhang | H04N 19/567 |
| 2018/0192069 A1* | 7/2018 | Chen | H04N 19/176 |
| 2021/0104021 A1* | 4/2021 | Sohn | G06T 5/70 |

OTHER PUBLICATIONS

Zhao et al., "CNN-Based Bi-Directional Motion Compensation for High Efficiency Video Coding", 2018 IEEE International Symposium on Circuits and Systems (ISCAS), IEEE, pp. 1-4, May 27, 2018.

(Continued)

*Primary Examiner* — Allen C Wong
(74) *Attorney, Agent, or Firm* — Xiaoan Lu

(57) ABSTRACT

For a bi-prediction block, the initial motion field can be refined using a DNN. In one implementation, the initial motion field is integer rounded to obtain initial prediction blocks. Based on the initial prediction, the DNN can generate motion refinement information, which is scaled and added to the sub-pel residual motion from the initial motion field to generate a refined motion field. The scaling factor can take a default value, or be based on the motion asymmetry. While the initial motion field is usually block based on sub-block based, the refined motion field is pixel based or sub-block based and can be at an arbitrary accuracy. The same refinement process is performed at both the encoder and decoder, and thus the motion refinement information need not to be signaled. Whether the refinement is enabled can be determined based on the initial motion, the block activities and the block size.

20 Claims, 11 Drawing Sheets

(58) Field of Classification Search
USPC .................................................. 375/240.16
See application file for complete search history.

(56) References Cited

OTHER PUBLICATIONS

Chen et al., "Algorithm description for Versatile Video Coding and Test Model 8 (VTM 8)", Document JVET-Q2002, Joint Video Experts Team (JVET) of ITU-T SG 16 WP 3 and ISO/IEC JTC 1/SC 29 WG 11, 17th Meeting: Brussels, BE, pp. 1-97, Jan. 7-17, 2020.

* cited by examiner (a)

901

(b)

902

(c)

MOTION REFINEMENT USING A DEEP NEURAL NETWORK

CROSS REFERENCE TO RELATED APPLICATIONS

This application is a U.S. National Stage Application under 35 U.S.C. 371 of International Patent Application No. PCT/EP2021/063056, filed May 18, 2021, which is incorporated herein by reference in its entirety.

This application claims the benefit of European Patent Application No. EP20305565.2 filed May 29, 2020, which is incorporated herein by reference in its entirety.

TECHNICAL FIELD

The present embodiments generally relate to a method and an apparatus for motion refinement in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: obtaining a first motion field and a second motion field for a block of a picture, wherein said first motion field corresponds to a first reference picture and said second motion field corresponds to a second reference picture; obtaining a first motion-compensated prediction block for said block based on said first motion field for said block, and obtaining a second motion-compensated prediction block for said block based on said second motion field for said block; obtaining a third motion field between said first and second motion-compensated prediction blocks, using a deep neural network; refining said first and second motion fields, based on said third motion field; and obtaining a prediction block for said block, based on said refined first and second motion fields.

According to another embodiment, an apparatus for video encoding or decoding is provided, comprising one or more processors, wherein said one or more processors are configured to: obtain a first motion field and a second motion field for a block of a picture, wherein said first motion field corresponds to a first reference picture and said second motion field corresponds to a second reference picture; obtain a first motion-compensated prediction block for said block based on said first motion field for said block, and obtaining a second motion-compensated prediction block for said block based on said second motion field for said block; obtain a third motion field between said first and second motion-compensated prediction blocks, using a deep neural network; refine said first and second motion fields, based on said third motion field; and obtain a prediction block for said block, based on said refined first and second motion fields.

According to another embodiment, an apparatus of video encoding or decoding is provided, comprising: means for obtaining a first motion field and a second motion field for a block of a picture, wherein said first motion field corresponds to a first reference picture and said second motion field corresponds to a second reference picture; means for obtaining a first motion-compensated prediction block for said block based on said first motion field for said block, and obtaining a second motion-compensated prediction block for said block based on said second motion field for said block; means for obtaining a third motion field between said first and second motion-compensated prediction blocks, using a deep neural network; means for refining said first and second motion fields, based on said third motion field; and means for obtaining a prediction block for said block, based on said refined first and second motion fields.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
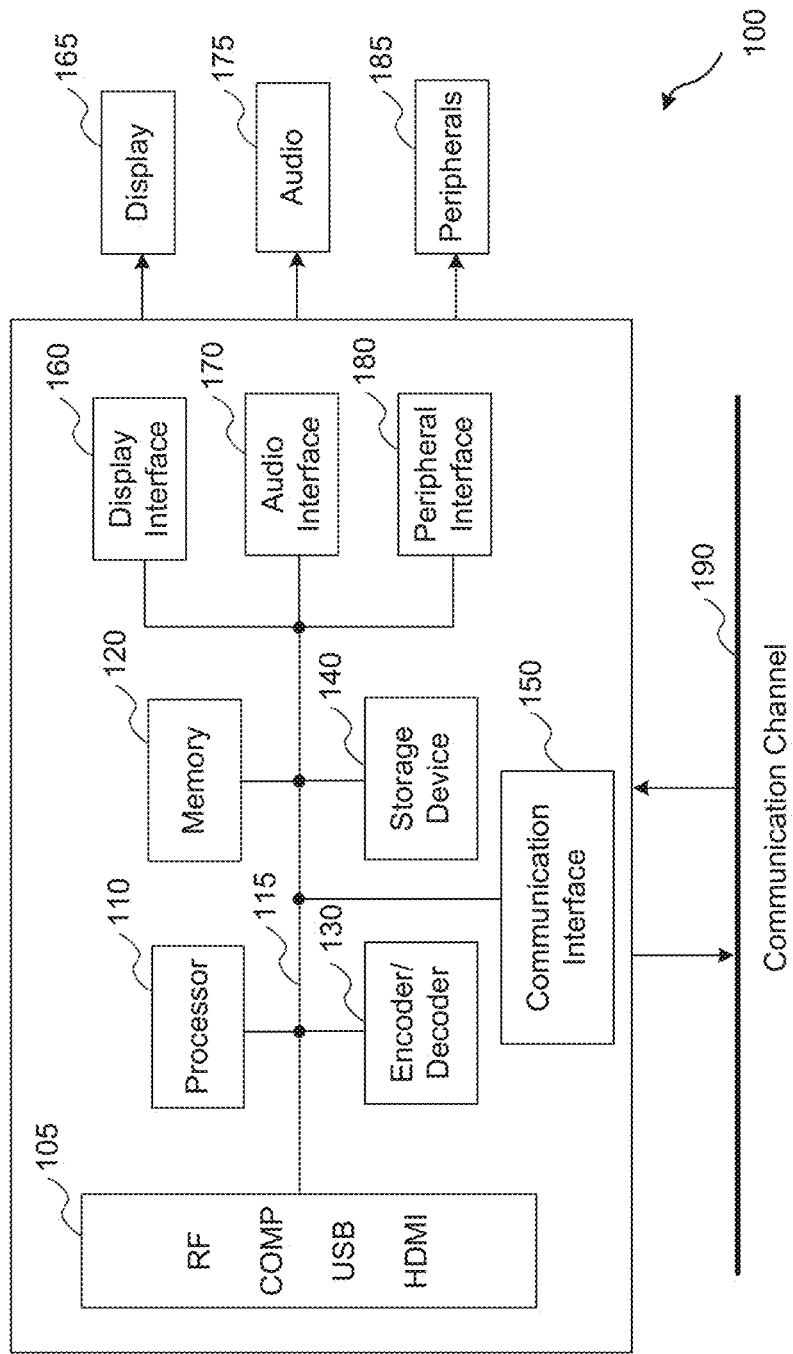
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
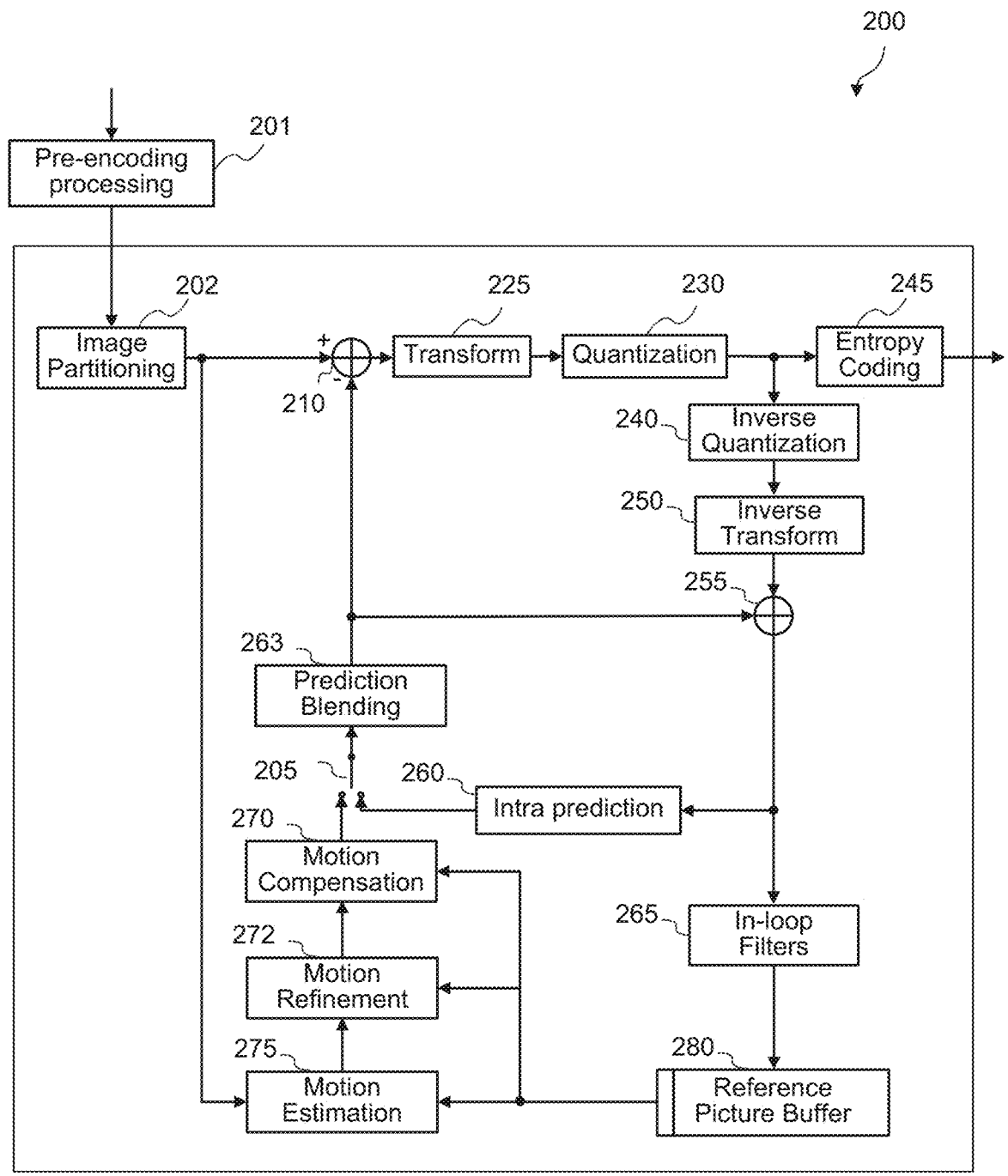
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
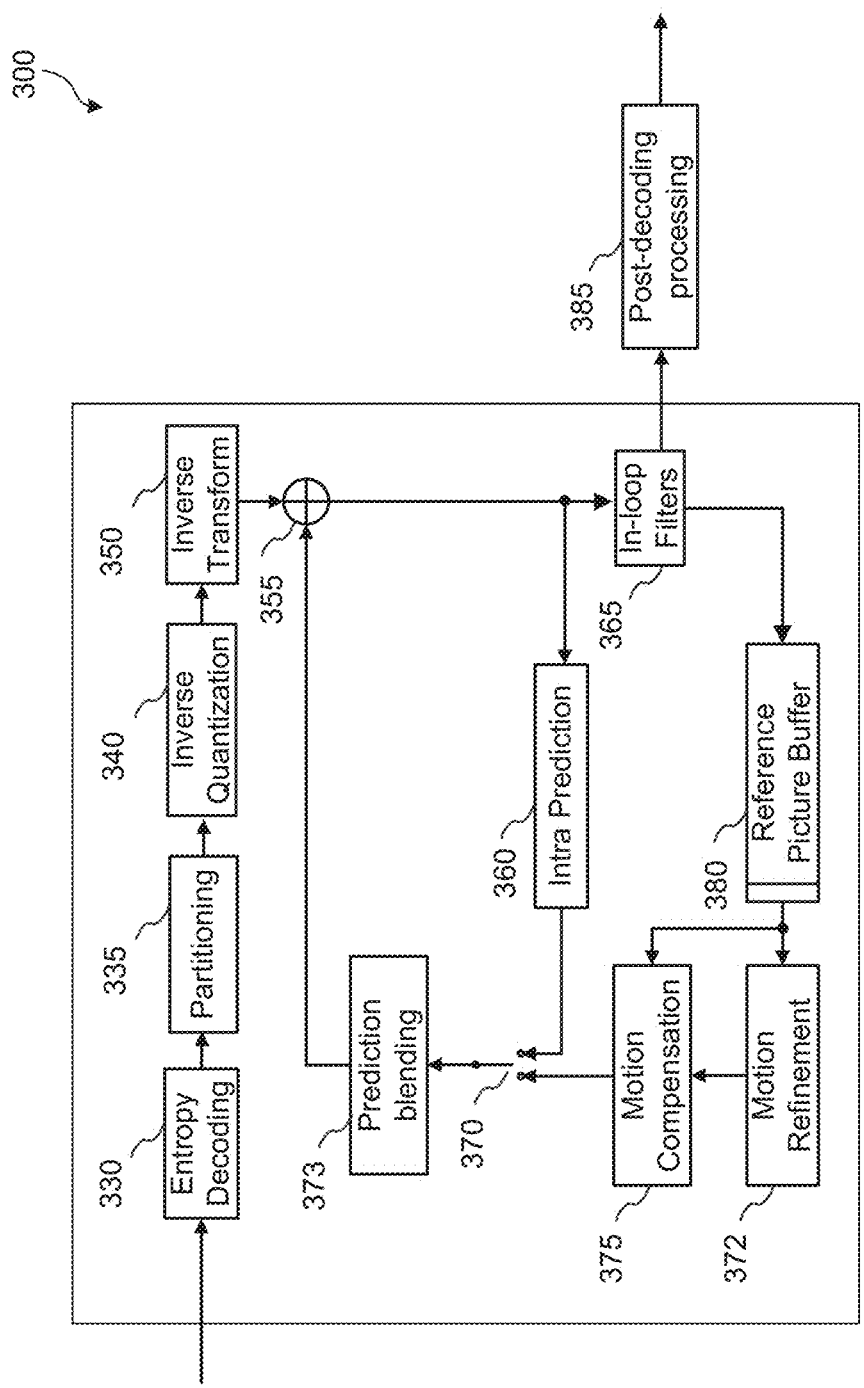
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Affine Mode in VVC

In HEVC, only translational motion model is applied for motion-compensated prediction. To consider other types of motion, e.g., zoom in/out, rotation, perspective motions and other irregular motions, an affine motion-compensated prediction is applied in the VTM. The affine motion model in VTM is either 4-parameter or 6-parameter.

Figure 4:
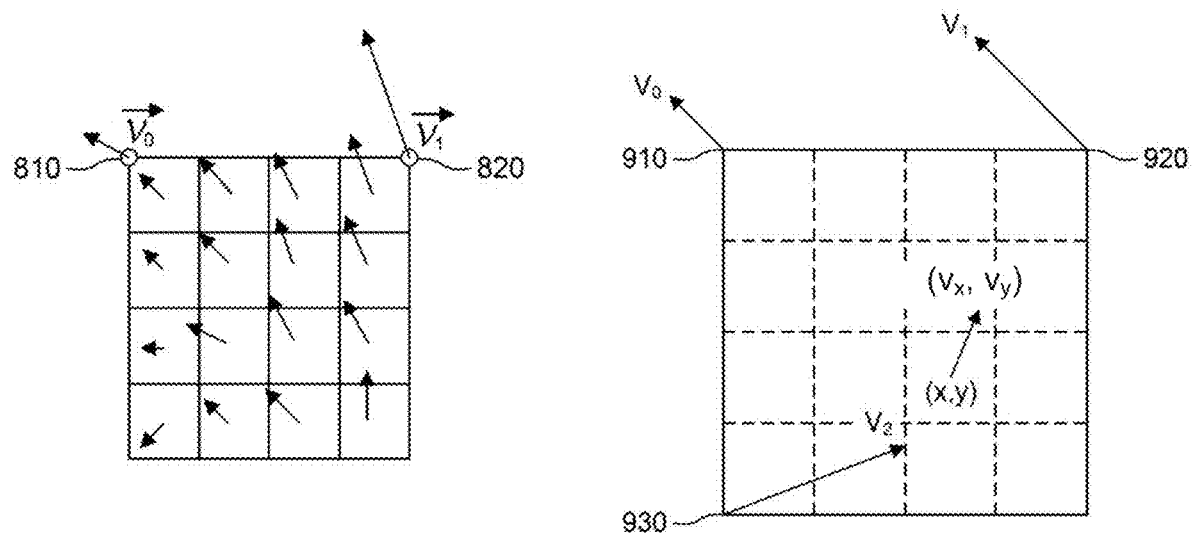
FIG. 4 illustrates a motion field based on the affine motion model.

The four-parameter affine motion model has the following parameters: two parameters for translation movement in horizontal and vertical directions, one parameter for zoom motion for both directions, and one parameter for rotation motion for both directions. Horizontal zoom parameter is equal to vertical zoom parameter. This four-parameter affine motion model is coded in VTM using two motion vectors at two control point positions defined at top-left corner and top-right corner of current CU. As shown in FIG. 4, the affine motion field of the block, i.e. the motion of all elementary sub-blocks of the block, is described by two control point motion vectors ($V_0$, $V_1$). In VTM, the sub-block size is fixed to 4×4 pixels. Based on the control point motion, the motion field ($v_x$, $v_y$) of one affine coded block is described as $$v_x = \frac{(v_{1x} - v_{0x})}{w}x - \frac{(v_{1y} - v_{0y})}{w}y + v_{0x}$$

$$v_y = \frac{(v_{1y} - v_{0y})}{w}x + \frac{(v_{1x} - v_{0x})}{w}y + v_{0y}$$

where ($v_{0x}$, $v_{0y}$) is motion vector of the top-left corner control point (810), and ($v_{1x}$, $v_{1y}$) is motion vector of the top-right corner control point (820), and w is the width of CU. In VTM, the motion field of an affine coded CU is derived at the 4×4 block level, that is, ($v_x$, $v_y$) is derived for each of the 4×4 blocks within the current CU and applied to the corresponding 4×4 block.

The 6-parameter affine motion model has the following parameters: two parameters for translation movement in horizontal and vertical directions, two parameters for scaling (horizontal and vertical), one parameter for rotation and one parameter for shearing. The 6-parameter affine motion model is coded with three MVs ($V_0$, $V_1$, $V_2$) at three control points (910, 920, 930). As shown in FIG. 4, three control points for 6-parameter affine coded CU are defined at top-left, top-right and bottom left corner of CU. The motion at top-left control point is related to translation motion, others control points are related to scaling, rotation and shearing of the block. For 6-parameter affine motion model, the scaling motion in horizontal direction may not be same as those motion in vertical direction. The motion vector of each sub-block ($v_x$, $v_y$) is derived using three MVs at control points (910, 920, 930) as:

$$v_x = v_{0x} + (v_{1x} - v_{0x}) * \frac{x}{w} + (v_{2x} - v_{0x}) * \frac{y}{h}$$

$$v_y = v_{0y} + (v_{1y} - v_{0y}) * \frac{x}{w} + (v_{2y} - v_{0y}) * \frac{y}{h}$$

where ($v_{2x}$, $v_{2y}$) is motion vector of the bottom-left control point (930), (x, y) is the center position of sub-block, w and h are the width and height of CU.

Decoder Side Motion Vector Refinement in VVC

Figure 5:
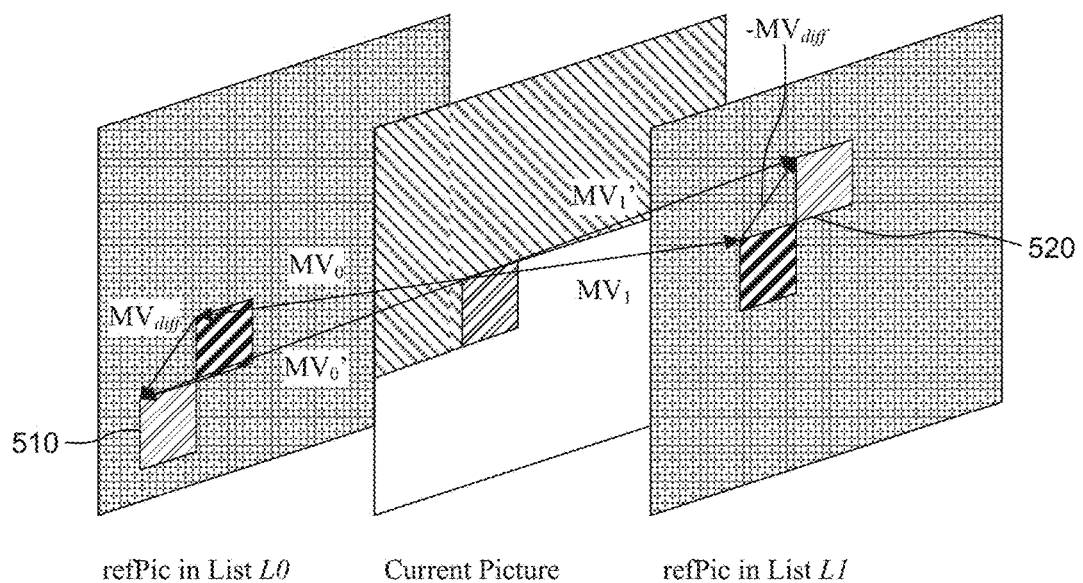
FIG. 5 illustrates Decoder Side Motion Vector Refinement (DMVR) in VVC draft 5.

FIG. 5 illustrates Decoder Side Motion Vector Refinement (DMVR) as used in VVC draft 5. It consists in refining a pair of bi-directional motion vectors, around two initial MVs ($MV_0$, $MV_1$) in reference picture lists L0 and L1. The motion vectors are refined by minimizing the SAD (Sum of Absolute Differences) between the two refined reference blocks (510, 520). The refined motion vectors $MV_0'$ and $MV_1'$ are then used to perform the motion-compensated bi-prediction of the current block in the current picture.

In VVC, DMVR is applied for the CUs which fulfill the following conditions:
  The CU is coded in merge mode with bi-prediction.
  One reference picture is in the past and another reference picture is in the future with respect to the current picture.
  The reference pictures in list L0 and list L1 have equal temporal distance to the current picture.
  The CU size is higher than 128 luma samples and the CU height and width is at least 8 luma samples.

The refined MVs derived by DMVR are used for INTER prediction of CUs to code and are stored in the temporal motion buffer. Thus, they may be used for the temporal prediction of motion information in subsequent pictures to code/decode. On the contrary, original, non-DMVR-refined motion vectors are used in the deblocking filtering process and for spatial motion vector prediction of future coding units in the same picture.

As shown in FIG. 5, the search points are surrounding the initial MV and the MV offset obeys the MV difference symmetrical rule. In other words, any points that are checked by DMVR, denoted by candidate MV pair ($MV_0'$, $MV_1'$) obey the following two equations:

$$MV_0' = MV_0 + MV_{offset}$$

$$MV_1' = MV_1 - MV_{offset}$$

where $MV_{offset}$ represents the refinement offset between the initial MV and the refined MV in one of the reference pictures. In VVC draft 5, the refinement search range is two integer luma samples from the initial MV. and sub-pixel motion refinement is computed directly from the SAD values obtained at the various integer displacement positions by fitting a quadratic curve and computing the minimum.

As described above, DMVR allows to automatically refine at the decoder side a bi-directional motion field sent by the encoder. However, the refinement is done using traditional motion estimation (block matching) using sub-block refinement. Moreover, the pixel motion is still based on a defined motion accuracy (typically ¼ pixel motion).

Bi-Directional Optical Flow (BDOF) in VVC

Conventional bi-prediction in video coding is a simple combination of two temporal prediction blocks obtained from the reference pictures that are already reconstructed. However, due to the limitation of the block-based motion compensation (MC), there could be remaining small motion that can be observed between the samples of two prediction blocks. To solve this problem, the bi-directional optical flow (BDOF) tool is included in VTM to reduce the impacts of such motion for every sample inside one block. BDOF is used to refine the bi-prediction signal of a CU at the 4×4 sub-block level. The BDOF mode is based on the optical flow concept, which assumes that the motion of an object is smooth and its luminance is constant along the considered time interval. In case of bi-prediction, the goal of BDOF is to refine motion for each sample assuming linear displacement in-between the two reference pictures and based on Hermite's interpolation of the optical flow as shown in FIG. 6.

Specifically, BDOF is sample-wise motion refinement that is performed on top of the block-based motion-compensated predictions when bi-prediction is used. The sample-level motion refinement does not use signaling. In the current BDOF design, the derivation of the refined motion vector for each sample in one block is based on the classical optical flow model. Let $I^{(k)}(x, y)$ be the sample value at the coordinate (x, y) of the prediction block derived from the reference picture list k (k=0, 1), and $\partial I^{(k)}(x,y)/\partial x$ and $\partial I^{(k)}(x,y)/\partial y$ are the horizontal and vertical gradients of the sample. Given the optical flow model, the motion refinement ($v_x$, $v_y$) at (x, y) can be derived by $$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0$$

Figure 6:
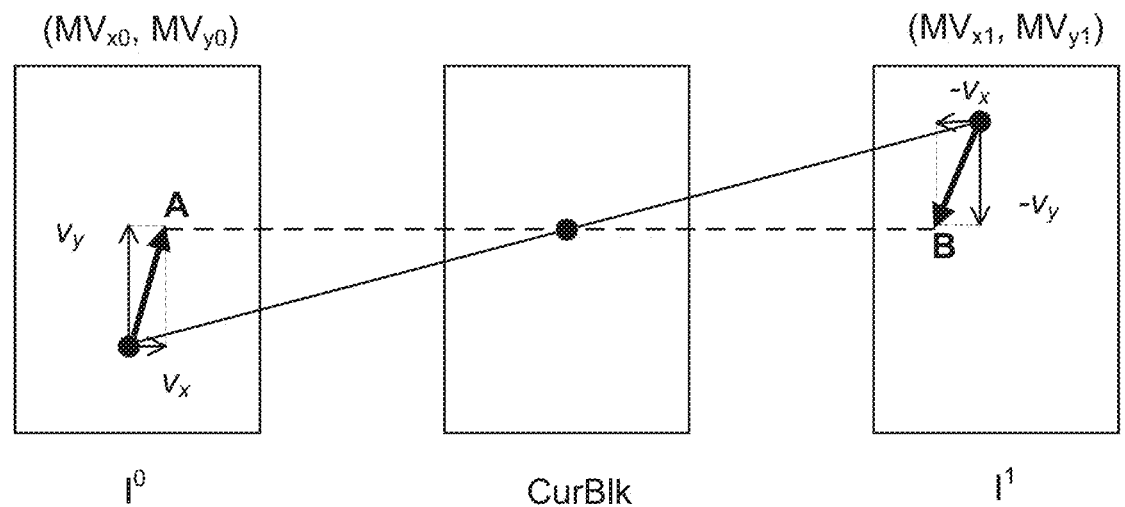
FIG. 6 illustrates BDOF (Bi-directional Optical Flow) used in VTM.

In FIG. 6, ($MV_{x0}$, $MV_{y0}$) and ($MV_{x1}$, $MV_{y1}$) indicate the block-level motion vectors that are used to generate the two prediction blocks $I^{(0)}$ and $I^{(1)}$. Further, the motion refinement ($v_x$, $v_y$) at the sample location (x, y) is calculated by minimizing the difference $\Delta$ between the values of the samples after motion refinement compensation (i.e., A and B in FIG. 6), as shown as $$\Delta(x, y) = I^{(0)}(x, y) - I^{(1)}(x, y) +$$

$$v_x \left( \frac{\partial I^{(1)}(x, y)}{\partial x} + \frac{\partial I^{(0)}(x, y)}{\partial x} \right) + v_y \left( \frac{\partial I^{(1)}(x, y)}{\partial y} + \frac{\partial I^{(0)}(x, y)}{\partial y} \right).$$

To ensure the regularity of the derived motion refinement, it is assumed that the motion refinement is consistent for the samples inside one 4×4 sub-block. For each 4×4 sub-block, a motion refinement ($v_{yB}$, $v_{yB}$) is calculated by minimizing the difference between the L0 and L1 prediction samples. The motion refinement is then used to adjust the bi-predicted sample values in the 4×4 sub-block.

As described above, BDOF provides a luma sample correction (offset) on the already motion-compensated blocks. However, BDOF does not output a motion field refinement.

A DNN (Deep Neural Network) is a neural network composed of multiple layers introducing non-linearity and for which parameters have been found by machine learning methods, typically a training on large database of examples. Some existing DNN-based motion estimation (or frame interpolation) in video coding has shown good results for short motion amplitude for pixel-based motion with arbitrary motion accuracy. However, an issue with the existing end-to-end approach is that the result entirely relies on the input (input images) and control/adjustment of the output (the motion field for example) is difficult.

The present application provides various embodiments for decoder side motion refinement, based on the use of DNN.

Figure 7:
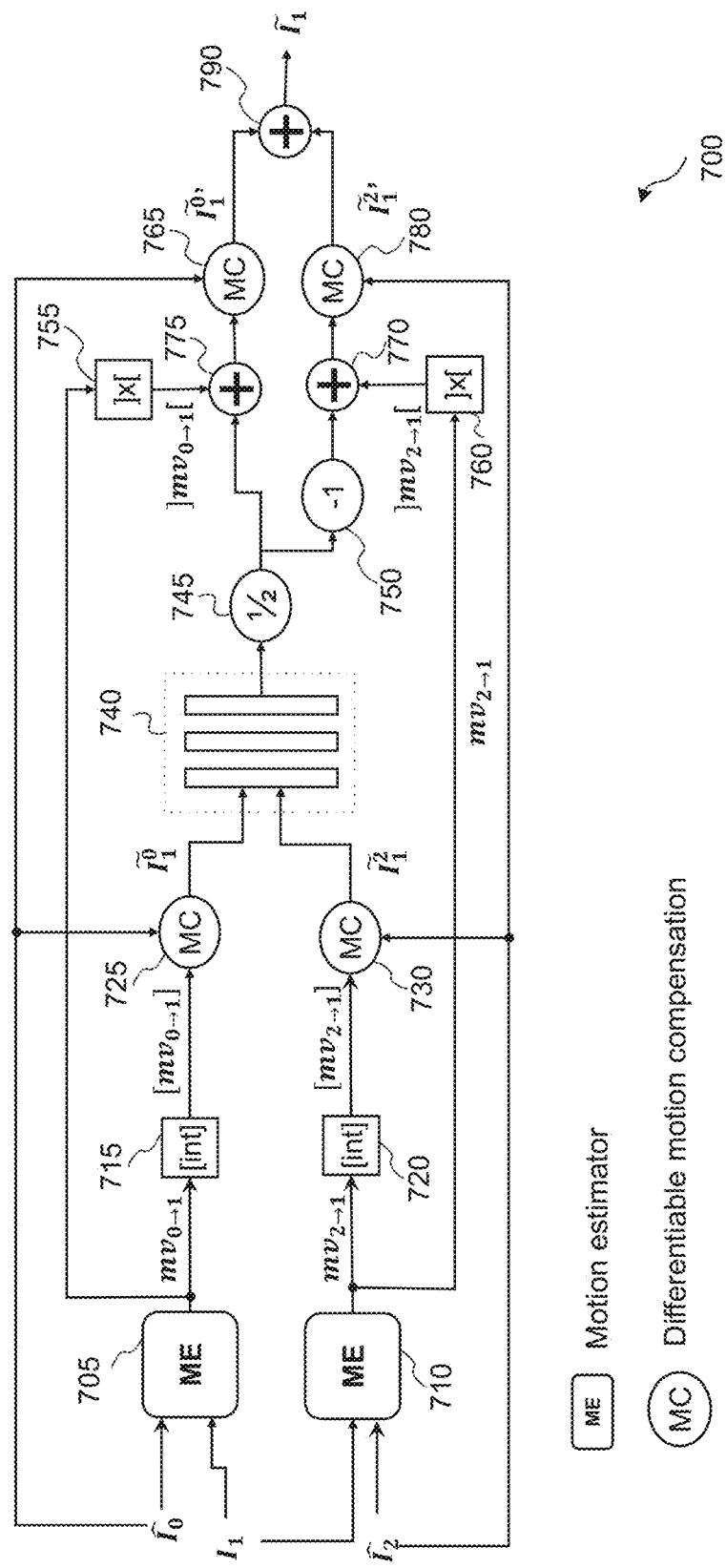
FIG. 7 illustrates a method of motion field refinement using a DNN at the encoder side, according to another embodiment.

FIG. 7 illustrates method 700 that uses a DNN to generate pixel-based motion field refinement at an encoder, according to an embodiment. We assume that the current picture to be encoded is $I_1$, and that pictures $I_0$ (in the past of $I_1$) and $I_2$ (in the future of $I_1$) have been already coded and reconstructed such that they would be also available at the decoder side. For each block to be encoded of image $I_1$, when a bi-directional candidate using reference images $I_0$ and $I_2$ is evaluated, process 700 is used.

At first, an initial uniform motion field is computed (705, 710) between the current image $I_1$ and $I_0$ in the past (resp. $I_2$ in the future), which produces a motion field $mv_{0 \to 1}$ (resp. $mv_{2 \to 1}$). This initial motion search can be performed using, for example, traditional block matching inside a Rate-Distortion Optimization (RDO) loop. The initial motion estimation is block based and two motion vectors (one for each direction) is obtained for the block, namely, all pixels in the block use the same motion vector for each direction. Thus, we consider the initial motion field as a uniform motion field. The initial motion vectors are usually implicitly or explicitly encoded in the bitstream, for example, using the AMVP (Advanced Motion Vector Prediction) mode or merge mode.

From this initial bi-directional motion an integer-pel motion field [$mv_{0 \to 1}$] (resp. [$MV_{2 \to 1}$]) is derived (715, 720), and residual of the motion field (]$mv_{0 \to 1}$[,]$mv_{2 \to 1}$[) is obtained (755, 760). Here, since the initial motion is block-based (a single motion vector for the block), the integer-based motion field corresponds to the integer portion of the motion vector for the block. From this motion, an integer-pel motion compensation (MC) is performed (725, 730) using the reference image $\widehat{I_0}$ already reconstructed (resp. $\widehat{I_2}$). The advantage of the integer-based MC is that no interpolation is needed to produce the motion-compensated prediction $\widetilde{I_1^0}$ $\widetilde{I_1^2}$), which is to be used as the input block for the DNN (740).

Figure 8:
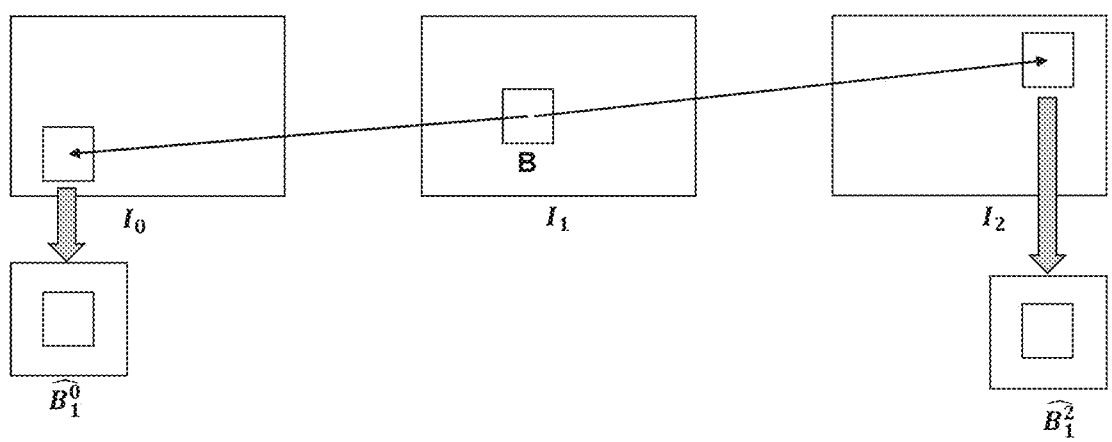
FIG. 8 illustrates that blocks are enlarged to be input to the DNN.

It should be noted as illustrated in FIG. 8 that the input blocks of the DNN can be an enlarged version of the original block and desired refined motion block size. This can be done by selecting a larger region in the images $I_0$ and $I_1$ or using padding for example if it is not available. It means the motion compensation is applied to an enlarged version of the block. For example, if the original block (B) to be encoded has a size of 16×16, the input blocks $\widehat{B_1^0}$ $\widehat{B_1^2}$) to the DNN can be for example of size 48×48 (i.e., adding a border of 16 on each side).

To estimate the motion between $I_1$ and $I_0$ and $I_1$ and $I_2$, the DNN (740) is used to estimate the motion from image block of $I_0$ $\widehat{B_1^0}$) to block of $I_2$ $\widehat{B_1^2}$). The DNN output motion information for each pixel in the block and motion vectors may vary from pixel to pixel. The output motion may be at the internal motion accuracy, for example, 1/16-pel as in VVC, or at another accuracy, such as ¼-pel. It is possible to get an arbitrary motion accuracy if the corresponding interpolation filters are available. Then the motion from the DNN is divided (745) by 2 and added (resp. subtracted, 770, 775) to the original residual sub-pixel motion to form the refined total motion between $I_1$ and $I_0$ (resp. $I_2$). The block is then motion compensated (765, 780) using the refined motion to generate two predictions $\widetilde{I_1^0}$ $\widetilde{I_1^2}$) using the reference pictures $\widehat{I_0}$ and $\widehat{I_2}$, respectively. For each pixel of the block, the usual motion compensation process is applied using individual motion vector. Alternatively, the produced motion field can be done on a sub-block basis (motion vectors are the same within a sub-block, but may vary from sub-block to sub-block), typically 4×4 pixels, and motion compensation is applied at the sub-block level. The two predictions are added (790) to form the final bi-directional prediction ($\tilde{I}_1$) for the current block. In the above refinement process, no side information needs to be sent to the decoder as all information are already available on decoder side.

Here, an example is provided to illustrate how the motion field for a 4×4 block evolves in the process. The example is shown for $mv_{0\rightarrow 1}$, and the principle is the same for $mv_{2\rightarrow 1}$ except that the final motion field is multiplied (745, 750) by $-\frac{1}{2}$. At first, the initial motion field $$mv_{0\rightarrow 1} = \left(12\frac{1}{2}, -3\frac{1}{4}\right)$$

for the block, and its integer-pel portion is $[mv_{0\rightarrow 1}]=(13,-3)$ and sub-pel portion is $$]mv_{0\rightarrow 1}[ = \left(-\frac{1}{2}, -\frac{1}{4}\right). \; mv_{0\rightarrow 1}, [mv_{0\rightarrow 1}] \text{ and } ]mv_{0\rightarrow 1}[$$

can also be represented as pixel-level motion fields:

$$mv_{0\rightarrow 1} = \begin{bmatrix} \left(12\frac{1}{2},-3\frac{1}{4}\right) & \left(12\frac{1}{2},-3\frac{1}{4}\right) & \left(12\frac{1}{2},-3\frac{1}{4}\right) & \left(12\frac{1}{2},-3\frac{1}{4}\right) \\ \left(12\frac{1}{2},-3\frac{1}{4}\right) & \left(12\frac{1}{2},-3\frac{1}{4}\right) & \left(12\frac{1}{2},-3\frac{1}{4}\right) & \left(12\frac{1}{2},-3\frac{1}{4}\right) \\ \left(12\frac{1}{2},-3\frac{1}{4}\right) & \left(12\frac{1}{2},-3\frac{1}{4}\right) & \left(12\frac{1}{2},-3\frac{1}{4}\right) & \left(12\frac{1}{2},-3\frac{1}{4}\right) \\ \left(12\frac{1}{2},-3\frac{1}{4}\right) & \left(12\frac{1}{2},-3\frac{1}{4}\right) & \left(12\frac{1}{2},-3\frac{1}{4}\right) & \left(12\frac{1}{2},-3\frac{1}{4}\right) \end{bmatrix},$$

$$[mv_{0\rightarrow 1}] = \begin{bmatrix} (13,-3) & (13,-3) & (13,-3) & (13,-3) \\ (13,-3) & (13,-3) & (13,-3) & (13,-3) \\ (13,-3) & (13,-3) & (13,-3) & (13,-3) \\ (13,-3) & (13,-3) & (13,-3) & (13,-3) \end{bmatrix},$$

$$]mv_{0\rightarrow 1}[ = \begin{bmatrix} \left(-\frac{1}{2},-\frac{1}{4}\right) & \left(-\frac{1}{2},-\frac{1}{4}\right) & \left(-\frac{1}{2},-\frac{1}{4}\right) & \left(-\frac{1}{2},-\frac{1}{4}\right) \\ \left(-\frac{1}{2},-\frac{1}{4}\right) & \left(-\frac{1}{2},-\frac{1}{4}\right) & \left(-\frac{1}{2},-\frac{1}{4}\right) & \left(-\frac{1}{2},-\frac{1}{4}\right) \\ \left(-\frac{1}{2},-\frac{1}{4}\right) & \left(-\frac{1}{2},-\frac{1}{4}\right) & \left(-\frac{1}{2},-\frac{1}{4}\right) & \left(-\frac{1}{2},-\frac{1}{4}\right) \\ \left(-\frac{1}{2},-\frac{1}{4}\right) & \left(-\frac{1}{2},-\frac{1}{4}\right) & \left(-\frac{1}{2},-\frac{1}{4}\right) & \left(-\frac{1}{2},-\frac{1}{4}\right) \end{bmatrix}.$$

The motion refinement information, namely, the output of DNN (740) in this example is as follows. Here, we use an arbitrary accuracy. In practice, it will likely to be 1/16-pel.

$$\begin{bmatrix} (26.6,-6.2) & (24.8,-2.8) & (26,-2) & (26.2,-4.4) \\ (28.2,-6) & (26.4,-6) & (26.4,-4.4) & (24.2,-6) \\ (27.2,-5.6) & (25,-6.2) & (28.2,-3) & (23.6,-5.6) \\ (21.6,-4.4) & (28.2,-6.2) & (26.4,-5.6) & (26.4,-6.2) \end{bmatrix}.$$

After the motion refinement information is scaled by ½ (745), it becomes:

$$\begin{bmatrix} (13.3,-3.1) & (12.4,-1.4) & (13,-1) & (13.1,-2.2) \\ (14.1,-3) & (13.2,-3) & (13.2,-2.2) & (12.1,-3) \\ (13.6,-2.8) & (12.5,-3.1) & (14.1,-1.5) & (11.8,-2.8) \\ (10.8,-2.2) & (14.1,-3.1) & (13.2,-2.8) & (13.2,-3.1) \end{bmatrix}.$$

Adding the above scaled motion refinement information to $]mv_{0\rightarrow 1}[$ (755), the final motion field is:

$$\begin{bmatrix} (12.8,-3.35) & (11.9,-1.65) & (12.5,-1.25) & (12.6,-2.45) \\ (13.6,-3.25) & (12.7,-3.25) & (12.7,2.45) & (11.6,-3.25) \\ (13.1,-3.05) & (12,-3.35) & (13.6,-1.75) & (11.3,-3.05) \\ (10.3,-2.45) & (13.6,-3.35) & (12.7,-3.05) & (12.7,-3.35) \end{bmatrix}.$$

Figure 9:
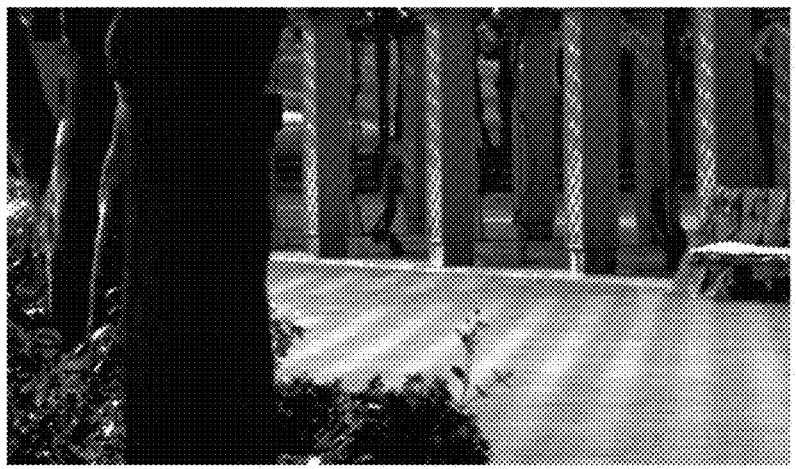
FIG. 9 illustrates a portion of picture to be encoded, motion fields before and after refinement.
Figure 9:
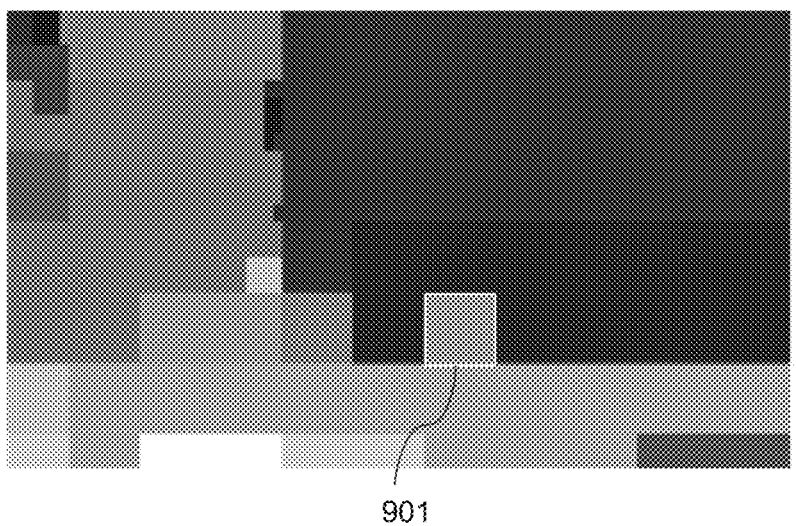
Figure 9:
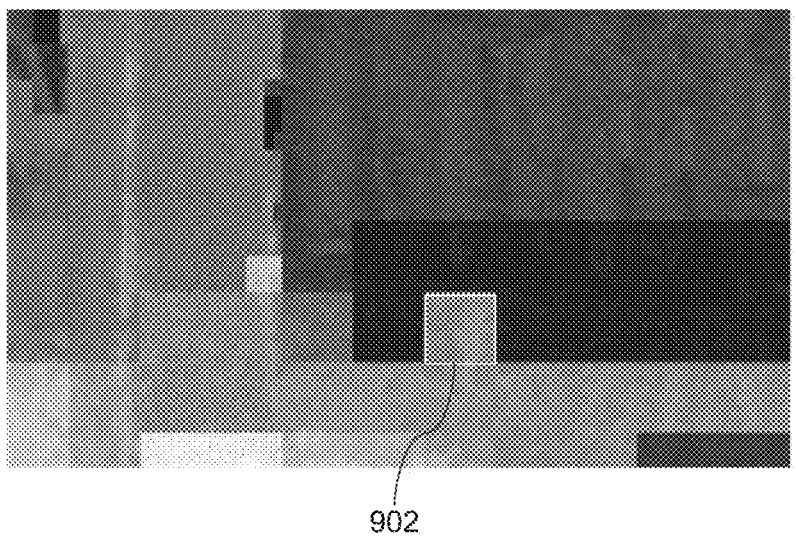

FIGS. 9(*a*), (*b*) and (*c*) illustrate a portion of the picture to be encoded, the initial motion field with respect to the past reference picture and the refined motion field, respectively. In FIGS. 9(*b*) and (*c*), different shades correspond to different motion magnitudes. As illustrated for a block (901, 902), the motion field is uniform for the block (same shade within block 901) in the initial motion field, and the refined motion field is pixel based (different shades within block 902).

In order to properly decode the bitstream, the decoder performs the same motion refinement process to the initial motion field as the process at the encoder. In particular, the same DNN structure is used at the decoder side, for example, the same structure is known at the encoder and decoder without signaling.

Figure 10:
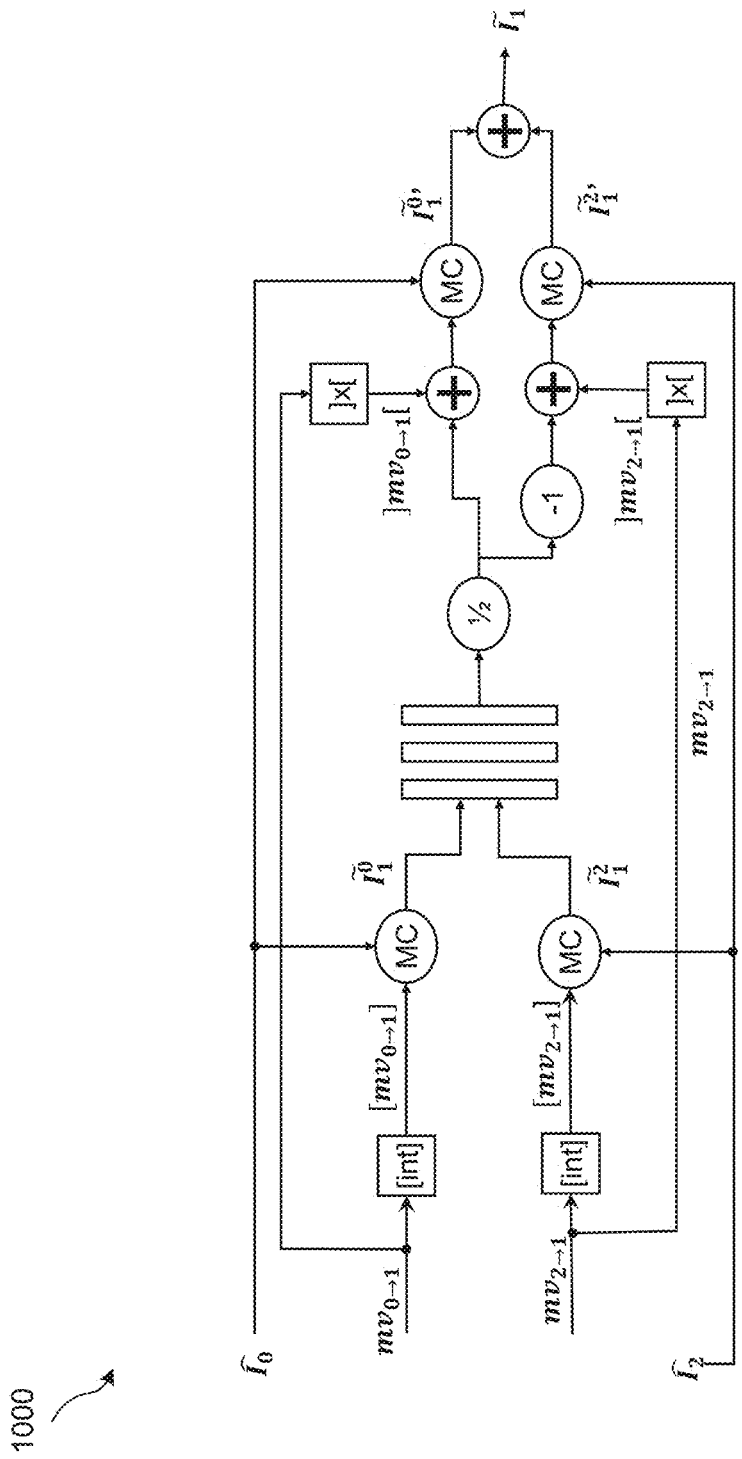
FIG. 10 illustrates a method of motion field refinement using a DNN at the decoder side, according to an embodiment.

FIG. 10 illustrates method 1000 that uses a DNN to generate pixel-based motion field refinement at a decoder, according to an embodiment. We assume that the current picture to be decoded is $I_1$, and that pictures $I_0$ (in the past of $I_1$) and $I_2$ (in the future of $I_1$) have been already decoded. For each block to be decoded of image $I_1$, when a bi-directional block using reference images $I_0$ and $I_2$ is decoded, process 1000 is used. At the decoder side, the initial motion field is obtained by decoding motion information from the bitstream, for example, based on the motion vector predictor and motion vector difference if present. Generally, given the initial motion field $mv_{0 \to 1}$ (resp. $mv_{2 \to 1}$), the motion refinement process same as the one at the encoder is used. For example, when method 700 is used for motion refinement at the encoder, the same steps as steps 715-790 as described for the encoder side are used at the decoder side.

In method 700, the initial motion is uniform. However, the initial motion may be from a more advanced motion model estimator and is not uniform on the block. In the following, we describe the process for an affine motion model, but this applies to any parametric motion model (homographic, rotational etc.).

Figure 11:
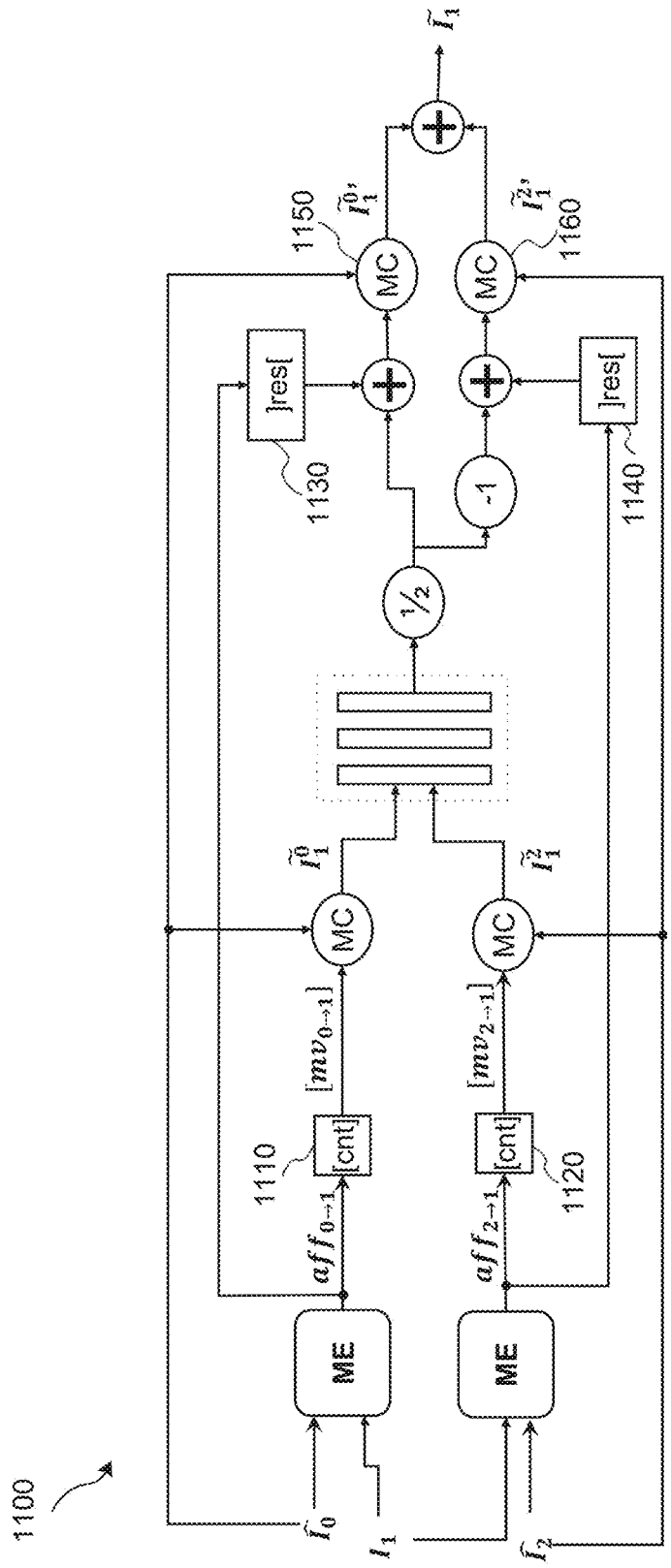
FIG. 11 illustrates a method of motion field refinement using a DNN at the encoder side when the affine motion model is used, according to an embodiment.

FIG. 11 illustrates method 1100 that uses a DNN to generate pixel-based motion field refinement for an initial affine motion field at an encoder, according to an embodiment. In method 1100, an affine motion estimator is used to estimate the motion between the current block and the corresponding block in a reference image (ME in the figure), and the resulted initial motion field is denoted as $aff_{0 \to 1}$ (resp. $aff_{2 \to 1}$). Because the motion is a function of the x and y positions of a pixel in the affine motion model, the motion may vary from pixel to pixel in the initial motion field.

From the initial affine motion, the motion of the center (alternatively another representative position, e.g., the top-left corner) is computed and rounded (1110, 1120) to the nearest integer on each component x and y, for example $[mv_{0 \to 1}]$ (resp. $[mv_{2 \to 1}]$). The motion refinement using the DNN is the same as the one described in method 700. Before performing the motion compensation (1150, 1160) using the refined total motion, the residual motion from the affine model is added to the estimated refinement motion field. For each pixel, a residual is computed (1130, 1140) as: $r(p) = aff_{0 \to 1}(p) - [mv_{0 \to 1}]$ for the motion from the first reference image. The function aff(p) represents the motion at pixel p using the affine model of the block. The motion r(p) (]res[) is the residual motion added before the motion compensation using the refined total motion. The rest of the process is similar to method 700.

Note that depending on the block prediction mode, the motion model used on each side (backward and forward) is not necessarily the same. For example, the backward prediction can use an affine motion model while the forward one uses a translational model. In this case, the process remains the same as a translational model can also be expressed as an affine model.

Because the affine motion model might produce pixel with a motion difference with the center pixel that is greater than one pixel, using method 1100 directly may cause the residual portion of the motion (]res[) to be greater than 1. To keep the residual motion at sub-pel only, the above process can be executed on sub-blocks of the original block.

Figure 12:
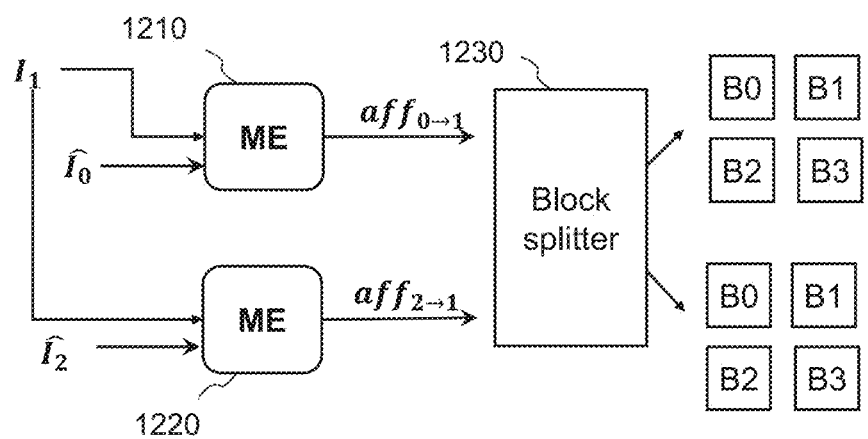
FIG. 12 illustrates splitting a block to sub-blocks, according to an embodiment.

As shown in FIG. 12, after motion estimation (1210, 1220), a block splitter (1230) will ensure that all sub-blocks in the original block use the same integer rounded motion compensation for the sub-block. In practice, it means the sub-block are chosen such as, for each pixel of the sub-block the rounded motion is the same. The motion refinement process then takes place for each sub-block. In this case, the absolute value of the added residual is always below 1 pixel on each motion vector.

In a variant, the block splitting is performed using a fixed integer motion threshold instead on the rounded motion difference between the pixel of the block and the center pixel, i.e., each pixel respects the following inequality: $r(p) \leq N$ (with N fixed or known at both encoder and decoder), where r(p) is the magnitude of residual motion between the pixel affine motion and the rounded affine motion of the center of the sub-block.

In other embodiments, the motion refinement process as described above is performed if one or more of the following conditions are satisfied. Because both the encoder and decoder can check whether the conditions are met, no signaling is needed to indicate whether the motion refinement process is enabled.

The original motion $mv_{0 \to 1}$ and $mv_{2 \to 1}$ are less than a given threshold.

The asymmetry between original motion $mv_{0 \to 1}$ and $mv_{2 \to 1}$ is less than a given threshold. Asymmetry can be computed simply using $|mv_{0 \to 1} + mv_{2 \to 1}|$ where |.| is the vector norm.

The asymmetry in direction between original motion $mv_{0 \to 1}$ and $mv_{2 \to 1}$ is less than a given threshold. Direction asymmetry can be computed simply using $A(mv_{0 \to 1}, -mv_{2 \to 1})$ where A(x,y) is the angle between the two vectors x and y. Alternatively, the direction asymmetry is computed only when the norms of the two vectors is greater than a given threshold, for example n=2 pixels.

The block activity in $I_0$ and $I_2$ is greater than a given threshold. The block activity can be computed for example using the sum of the norm of the spatial gradients in the block.

The block size is less or more than a given threshold.

Alternatively, a flag is sent to the decoder at the block level in order to indicate whether to activate the refinement or not.

Figure 13:
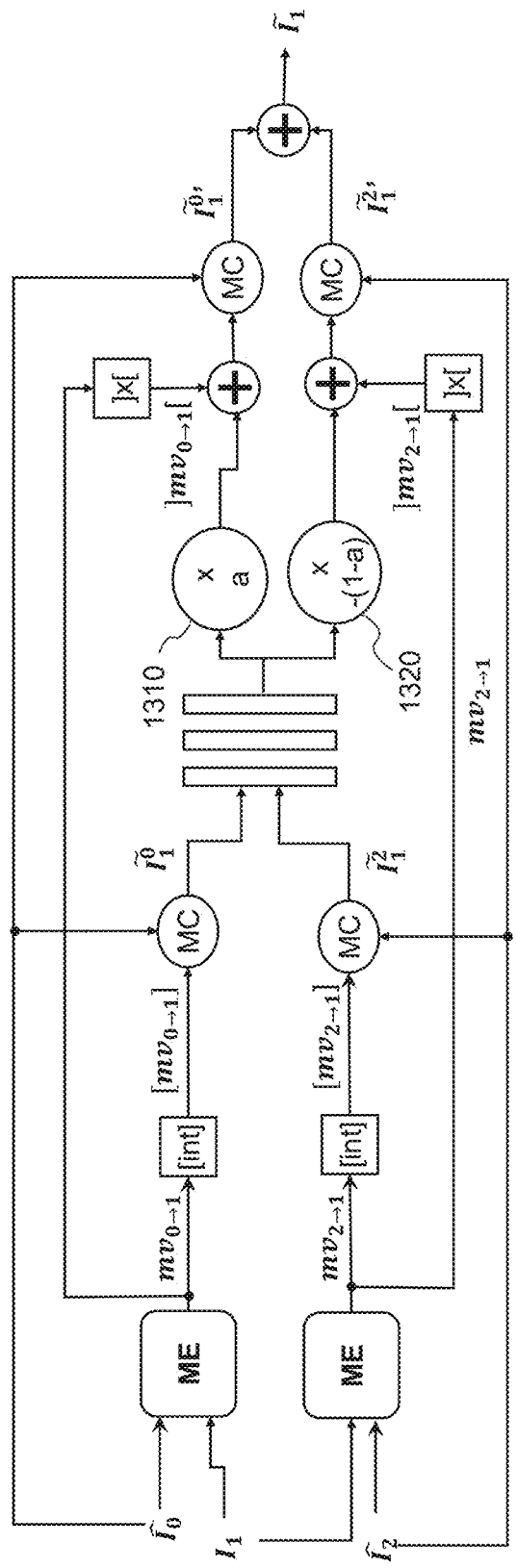
FIG. 13 illustrates a method of motion field refinement using a DNN at the encoder side when the scaling factors are a and −(1−a), according to an embodiment.

In another embodiment, the motion field scaling factor (weight) applied at the output of the DNN is computed based on the motion asymmetry. For example, as depicted in FIG. 13, the motion field is multiplied (1310) by "a" on one side (used to compensate using image $I_0$) and multiplied (1320) by $-(1-a)=(a-1)$ on the other side (used to compensate using image $I_2$).

The scaling factor "a" was set to a default value of 0.5 in previous embodiments. In this embodiment, the asymmetry in the motion is taken into account, for example by computing a as:

$$a = \frac{\|mv_{0 \to 1}\|}{\|mv_{0 \to 1}\| + \|mv_{2 \to 1}\|}$$

In order to get a stable value for "a", one or more the following processes can be used:

If the sum $\|mv_{0 \to 1}\| + \|mv_{2 \to 1}\|$ is less than a threshold, a is defaulted to 0.5.

The final value "a" can be clipped between two values, for example 0 and 1 or 0.05 and 0.95.

The asymmetry factor "a" is scaled by a factor.

For each asymmetry factor a, the final factor is given using a lookup table.

In order to lower signaling cost of the motion vectors $mv_{0\rightarrow 1}$ and $mv_{2\rightarrow 1}$ in standard AMVP (Advanced Motion Vector Prediction) mode or, to increase the variety of the candidates in standard MERGE mode (see "Versatile Video Coding (Draft 5)," JVET-N1001, 14th Meeting: Geneva, CH, 19-27 Mar. 2019, hereinafter "JVET-N1001"), the motion vectors can be changed such that the final motion fields after the refinement are kept the same or at least provide a similar RD (Rate Distortion) cost balance.

AMVP Optimization

Assuming an initial pair of vectors $mv_0=mv_{0\rightarrow 1}$ and $mv_1=mv_{2\rightarrow 1}$ for a bi-predicted block, the corresponding RD cost is computed as: $C=R(mv_0)+R(mv_1)+\lambda D$, where $R(mv)$ is the cost of sending the motion vector my (usually defined as the cost of the residual motion difference between a motion vector predictor and the motion vector), and D is the distortion of the block. For fast pass motion estimation, the distortion is usually defined as the SAD between the original block and the predicted block. For full pass, the distortion is between the reconstructed block (i.e., predicted+residual) and the original block (in this case the residual cost is also added to the RD cost). The parameter $\lambda$ is used to set the quality/cost balance. Note that in our case the prediction used is the one after motion refinement (corresponding to $\tilde{I}_1$ in the figures above).

In order to reduce the cost of the motion vector, the following strategy can be used:

Use a rounded/quantized version of the vector, similarly to AMVR (Adaptive Motion Vector Resolution, see JVET-N1001) and check that the cost C after refinement is better than the cost of transmitting the full precision vectors.

Use a quantized version of the motion vector difference only and check that the cost C after refinement is better than the cost of transmitting the full precision vectors.

Note that the above strategy can also be used in MMVD (Merge Motion Vector Difference), i.e., can be applied each time a motion vector needs to be transmitted explicitly.

Merge Mode Optimization

In merge mode, the cost of the motion vector is reduced to the cost of the index of the predictor. However, the diversity of the available motion vectors candidates is limited by the merge list size. In order to increase the diversity of the list, the same method as described above is applied to the motion vector predictors, such as, closed (but not equal) motion vectors candidates will be equal after the quantization process. As they are equal, the list pruning process, removing identical candidates, will remove them and allow to get more diverse candidates.

In the above embodiments, the initial motion field is decomposed into the integer portion ($[mv_{0\rightarrow 1}]$, $[mv_{2\rightarrow 1}]$) and the sub-pel portion $(]mv_{0\rightarrow 1}[, ]mv_{2\rightarrow 1}[)$, while the integer portion is used to generate the initial motion-compensated prediction block $\overline{I}_1^0, \overline{I}_1^2$ ) to be used by a DNN to generate motion refinement information, and the sub-pel portion is added to the scaled motion refinement information to obtain the refined motion to be used to generate another version of motion-compensated prediction block $\tilde{I}_1^0, \tilde{I}_1^2$ ). More generally, the initial motion field can be decomposed into two components, one component at a coarser accuracy (e.g., half pel, quarter pel) than the initial motion field, which will be used in place of ($[mv_{0\rightarrow 1}]$, $[mv_{2\rightarrow 1}]$), and the other component is the difference between the initial motion field and the coarser representation.

By using the motion refinement process as described above, pixel-based (or sub-block-based) motion field with arbitrary accuracy is achieved. Since no additional signaling is needed, by using DNN-based methods at both the encoder and decoder sides, the encoder may obtain a higher compression efficiency.

The motion refinement process as described above can be further used for image enhancement at the decoder side, for example, for denoising, spatial upscaling, and frame-rate increase, since a dense sub-pel bi-directional motion field is computed and available at the decoder.

Training Process

The above DNN networks can be trained using triplet of blocks: block from the past frame, block from the current frame and block from the future frame. The dataset is composed of a large number of such blocks extracted from video sequences.

The DNN network is typically a fully convolutional network or any of variant (resnet, dense net etc.). A loss function is computed based on a mean square error (or any other relevant metric) between the block of the current frame and the reconstructed block using the past and future blocks motion compensated based on the motion field after the motion field refinement. Other regularization term can also be applied during the training stage (absolute norm of the weights, motion total variation etc.).

In the above, the motion refinement process is performed block by block as the current video standards are usually block based. However, the present embodiments can be applied to a region that has a shape that is different from rectangular or square, as the DNN can be trained and implemented for other shapes, or can be a fully convolutional network, hence independent of the region shape or size.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the motion refinement and motion compensation modules (270, 272, 372, 375), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
obtaining a first motion field and a second motion field for a block of a picture, wherein said first motion field corresponds to a first reference picture and said second motion field corresponds to a second reference picture;
obtaining a first motion-compensated prediction block for said block based on said first motion field for said block, and obtaining a second motion-compensated prediction block for said block based on said second motion field for said block;
obtaining a third motion field representative of motion between said first and second motion-compensated prediction blocks, using a deep neural network, wherein said third motion field is a pixel-based motion field;

refining said first and second motion fields, based on said third motion field;

obtaining a prediction block for said block, based on said refined first and second motion fields; and decoding said block based on said prediction block.

2. The method of claim 1, further comprising:

decomposing said first motion field for said block into two components including a first component and a second component, and decomposing said second motion field for said block into two components including a third component and a fourth component, wherein said first component is at a coarser accuracy than said first motion field of said block, and wherein said third component is at a coarser accuracy than said second motion field of said block.

3. The method of claim 2, further comprising:

adding said second component of said first motion field to a scaled version of said third motion field to generate a fourth motion field, and adding said fourth component of said second motion field to another scaled version of said third motion field to generate a fifth motion field; and obtaining a third motion-compensated prediction block, based on said fourth motion field, and obtaining a fourth motion-compensated prediction block, based on said fifth motion field, wherein said prediction block is obtained based on said third and fourth motion-compensated prediction blocks.

4. The method of claim 1, further comprising:

determining whether said third motion field is to be obtained using said deep neural network, based on at least one of said first motion field, said second motion field, a block size, and block activities in a reference block in said first reference picture or said second reference picture.

5. The method of claim 1, wherein said obtaining a third motion field comprises:

forming a first extended block and a second extended block, wherein said first extended block includes said first motion-compensated prediction block and neighboring samples thereof, wherein said second extended block includes said second motion-compensated prediction block and neighboring samples thereof, and wherein said deep neural network uses said first and second extended blocks to generate said third motion field.

6. A non-transitory computer readable storage medium having stored thereon instructions for decoding a video according to the method of claim 1.

7. An apparatus for video decoding, comprising one or more processors, wherein said one or more processors are configured to:

obtain a first motion field and a second motion field for a block of a picture, wherein said first motion field corresponds to a first reference picture and said second motion field corresponds to a second reference picture;

obtain a first motion-compensated prediction block for said block based on said first motion field for said block, and obtain a second motion-compensated prediction block for said block based on said second motion field for said block;

obtain a third motion field representative of motion between said first and second motion-compensated prediction blocks, using a deep neural network, wherein said third motion field is a pixel-based motion field;

refine said first and second motion fields, based on said third motion field;

obtain a prediction block for said block, based on said refined first and second motion fields; and decode said block based on said prediction block.

8. The apparatus of claim 7, wherein said one or more processors are further configured to:

decompose said first motion field for said block into two components including a first component and a second component, and decomposing said second motion field for said block into two components including a third component and a fourth component, wherein said first component is at a coarser accuracy than said first motion field of said block, and wherein said third component is at a coarser accuracy than said second motion field of said block.

9. The apparatus of claim 8, wherein said one or more processors are further configured to:

add said second component of said first motion field to a scaled version of said third motion field to generate a fourth motion field, and adding said fourth component of said second motion field to another scaled version of said third motion field to generate a fifth motion field; and obtain a third motion-compensated prediction block, based on said fourth motion field, and obtaining a fourth motion-compensated prediction block, based on said fifth motion field, wherein said prediction block is obtained based on said third and fourth motion-compensated prediction blocks.

10. The apparatus of claim 7, wherein said one or more processors are further configured to:

determine whether said third motion field is to be obtained using said deep neural network, based on at least one of said first motion field, said second motion field, a block size, and block activities in a reference block in said first reference picture or said second reference picture.

11. A method for video encoding, comprising:

obtaining a first motion field and a second motion field for a block of a picture, wherein said first motion field corresponds to a first reference picture and said second motion field corresponds to a second reference picture;

obtaining a first motion-compensated prediction block for said block based on said first motion field for said block, and obtaining a second motion-compensated prediction block for said block based on said second motion field for said block;

obtaining a third motion field representative of motion between said first and second motion-compensated prediction blocks, using a deep neural network, wherein said third motion field is a pixel-based motion field;

refining said first and second motion fields, based on said third motion field;

obtaining a prediction block for said block, based on said refined first and second motion fields; and encoding said block based on said prediction block.

12. The method of claim 11, further comprising:

decomposing said first motion field for said block into two components including a first component and a second component, and decomposing said second motion field for said block into two components including a third component and a fourth component, wherein said first component is at a coarser accuracy than said first motion field of said block, and wherein said third component is at a coarser accuracy than said second motion field of said block.

13. The method of claim 12, further comprising:

adding said second component of said first motion field to a scaled version of said third motion field to generate a fourth motion field, and adding said fourth component of said second motion field to another scaled version of said third motion field to generate a fifth motion field; and obtaining a third motion-compensated prediction block, based on said fourth motion field, and obtaining a fourth motion-compensated prediction block, based on said fifth motion field, wherein said prediction block is obtained based on said third and fourth motion-compensated prediction blocks.

14. The method of claim 11, further comprising:

determining whether said third motion field is to be obtained using said deep neural network, based on at least one of said first motion field, said second motion field, a block size, and block activities in a reference block in said first reference picture or said second reference picture.

15. The method of claim 11, wherein said obtaining a third motion field comprises:

forming a first extended block and a second extended block, wherein said first extended block includes said first motion-compensated prediction block and neighboring samples thereof, wherein said second extended block includes said second motion-compensated prediction block and neighboring samples thereof, and wherein said deep neural network uses said first and second extended blocks to generate said third motion field.

16. A non-transitory computer readable storage medium having stored thereon instructions for encoding a video according to the method of claim 11.

17. An apparatus for video encoding, comprising one or more processors, wherein said one or more processors are configured to:

obtain a first motion field and a second motion field for a block of a picture, wherein said first motion field corresponds to a first reference picture and said second motion field corresponds to a second reference picture;

obtain a first motion-compensated prediction block for said block based on said first motion field for said block, and obtain a second motion-compensated prediction block for said block based on said second motion field for said block;

obtain a third motion field representative of motion between said first and second motion-compensated prediction blocks, using a deep neural network, wherein said third motion field is a pixel-based motion field;

refine said first and second motion fields, based on said third motion field;

obtain a prediction block for said block, based on said refined first and second motion fields; and encode said block based on said prediction block.

18. The apparatus of claim 17, wherein said one or more processors are further configured to:

decompose said first motion field for said block into two components including a first component and a second component, and decomposing said second motion field for said block into two components including a third component and a fourth component, wherein said first component is at a coarser accuracy than said first motion field of said block, and wherein said third component is at a coarser accuracy than said second motion field of said block.

19. The apparatus of claim 18, wherein said one or more processors are further configured to:

add said second component of said first motion field to a scaled version of said third motion field to generate a fourth motion field, and adding said fourth component of said second motion field to another scaled version of said third motion field to generate a fifth motion field; and obtain a third motion-compensated prediction block, based on said fourth motion field, and obtaining a fourth motion-compensated prediction block, based on said fifth motion field, wherein said prediction block is obtained based on said third and fourth motion-compensated prediction blocks.

20. The apparatus of claim 17, wherein said one or more processors are further configured to:

determine whether said third motion field is to be obtained using said deep neural network, based on at least one of said first motion field, said second motion field, a block size, and block activities in a reference block in said first reference picture or said second reference picture.

* * * * *